United States Patent [19]

Stewart

[11] 4,241,776

[45] Dec. 30, 1980

[54] TIRE AND WHEEL ASSEMBLIES

[75] Inventor: Charles G. Stewart, Warwickshire, England

[73] Assignee: Dunlop Limited, London, England

[21] Appl. No.: 4,261

[22] Filed: Jan. 17, 1979

[30] Foreign Application Priority Data

Jan. 21, 1978 [GB] United Kingdom ............... 2512/78
Feb. 14, 1978 [GB] United Kingdom ............... 5786/78

[51] Int. Cl.³ .......................................... B60B 21/10
[52] U.S. Cl. ................................ 152/381.4; 301/97
[58] Field of Search ................................ 301/95–97; 152/379.1, 379.2, 381.1, 381.2, DIG. 9, 362 R, 362 CS

[56] References Cited

U.S. PATENT DOCUMENTS

| 3,885,615 | 5/1975 | Mitchell | 152/381.2 X |
| 3,933,392 | 1/1976 | Wells | 301/97 X |
| 4,148,348 | 4/1979 | French et al. | 152/379.1 |
| 4,151,870 | 5/1979 | Watts | 152/379.1 X |

FOREIGN PATENT DOCUMENTS

| 529663 | 8/1956 | Canada | 152/DIG. 9 |
| 640327 | 7/1950 | United Kingdom . | |
| 814403 | 6/1959 | United Kingdom . | |

*Primary Examiner*—Charles A. Marmor
*Attorney, Agent, or Firm*—Stevens, Davis, Miller & Mosher

[57] ABSTRACT

A wheel rim having a well for tire fitting and adjacent each bead seat a circumferentially extending groove formed to accommodate an extended bead retaining toe of a tire wherein at least one air pressure release passage is provided from a point within the groove positioned such that a correctly fitted retaining toe covers the point. The passage may comprise a groove across the bead seat or a hole through the rim.

14 Claims, 4 Drawing Figures

TIRE AND WHEEL ASSEMBLIES

This invention relates to tire and wheel assemblies and in particular to tubeless tire and wheel assemblies which use a wheel rim as disclosed in our U.S. Pat. No. 4,148,348 issued Apr. 10, 1979.

The wheel rim disclosed in the above-mentioned application has provided immediately adjacent to and axially inwards of one or both tire bead seating regions a circumferentially extending groove. The tire for which the rim is designed has provided an axially and radially inwardly projecting toe portion on the respective bead or beads which engages in the groove or grooves and provides in the assembly a bead retention system of great effectiveness even with the tire fully deflated.

It has been shown that a standard shaped tire head is not satisfactory when fitted to the above type of wheel rim and cannot provide an assembly which is entirely safe. Air loss can occur during extreme driving conditions particularly involving generation of side forces even with the tire initially fully inflated. One means for ensuring an acceptable assembly by present standards of a tire with a standard bead and a rim of the above type having a retaining groove or grooves adjacent the bead seat or seats is to provide a filler for the groove or grooves. Nevertheless it is still possible for the groove filling means to be incorrectly fitted or omitted entirely and thus provide an incorrect assembly. It should be noted that such an assembly or indeed any other mismatched assembly would not provide the very effective bead retention feature described in the above-quoted example with a projecting toe on the tire bead.

One object of the present invention, therefore, is to provide a wheel rim which ensures correct matching of tire and wheel rim type and prevents use of a mismatched assembly.

According to one aspect of the present invention a wheel rim comprises a pair of spaced-apart flanges, a bead seat adjacent each flange, a tire fitting well, and immediately adjacent at least one of the bead seats between the bead seat and the fitting well a circumferentially extending groove formed so as to be able to accommodate an extended bead-retaining toe of a tire wherein at least one air pressure release passage is provided from a point within the groove, the point being positioned so that it is covered by a correctly fitted bead retaining toe.

The point at which the air passage begins is preferably on the axially outer face of the groove and may be positioned at the centre of said axially outer surface. The air passage may be in the form of an aperture through the wheel rim or may be in the form of a groove formed in the radially outer surface of the wheel rim. The groove may extend all the way across the bead seat and up the flange to connect to atmosphere or may be stopped short of the edge of the flange and be connected to an aperture through the wheel rim. The groove may be machined into a wheel rim, cast into a cast wheel rim or formed into a rolled wheel rim. In the case of a hole it may be punched or drilled.

A single passage may be provided for a groove or two or more passages may be provided which may be equally spaced around the circumference of the wheel rim. In the case of two or more passages they may be interconnected, for example a small groove along the face of the groove.

In the case of air passages in the form of grooves each groove must be sufficiently deep to allow effective leakage when the rubber tire is mounted on the bead seat. In the case of a hole a diameter of between 0.75 and 3 mm is suitable. A preferred range of hole diameters for car wheels is in the range of 1 to 1.5 mm.

Further aspects of the present invention will be apparent from the following description, by way of example only, in conjunction with the attached diagrammatic drawings in which.

Figure 1:
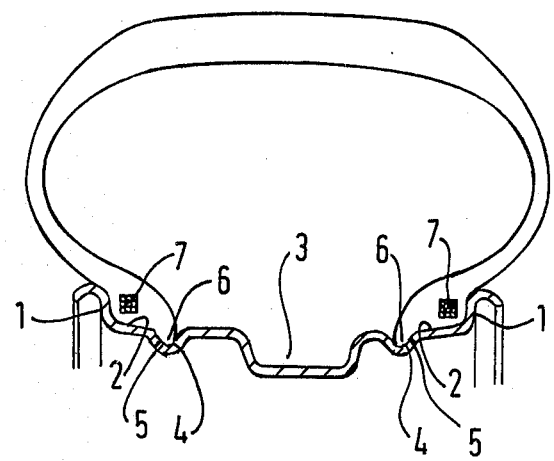
FIG. 1 is a transverse cross-section of a tire and wheel rim assembly according to one aspect of the present invention.

In both examples the wheel rim is the same and common reference numerals are used. The wheel rims comprise a pair of spaced-apart flanges 1, a pair of bead seats 2 one adjacent each flange 1, a central tire fitting well 3 and adjacent to each bead seat 2 is a groove 4. The grooves 4 are, in the examples, rolled, smoothly curved, grooves and each extends circumferentially around the rim.

A small hole 5 of 1.2 mm diameter is drilled through the wheel rim on the axially outer face of each groove 4. The exact position on the outer face will be explained below. Both holes are shown in the Figure but it should be understood that they do not need to be at the same circumferential position around the rim.

The assembly of FIG. 1 has a tire having an axially and radially projecting toe portion 6 formed on each tire bead and conventional bead reinforcing coils 7. The toe material is chosen so that the tire bead pivots under side load applied to the tire tread and the bead is retained at its bead seat even when the tire is run completely deflated. The toe portion 6 fits into the groove 4 and the hole 5 is positioned on the outer groove face so that the toe covers the hole 5 and prevents the escape of air.

If the tire is incorrectly fitted to the rim, for example with the toe portion 6 not fully home in the groove 4, air escapes through the hole 5 and the assembly will not remain inflated. Thus the holes 5 provide a check on correct assembly of tire and wheel rim.

If a standard bead construction tire is fitted to the wheel rim the lack of the axially and radially projecting toe portion 6 needed to fill the groove 4 and cover the holes 5 will cause the assembly after initial inflation to deflate through the holes 5 and thus prevent use of an incorrect assembly.

Figure 2:
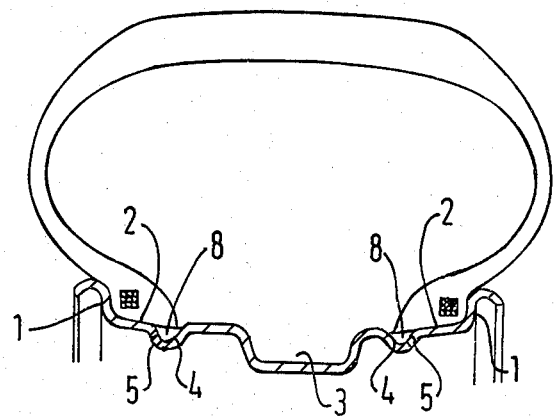
FIG. 2 is a transverse cross-section of a wheel rim as in the example of FIG. 1 but fitted with a standard bead tire and groove filling means again as further modified according to the present invention.

FIG. 2 shows the invention applied to allow the use of standard tires on the wheel having a groove or grooves 4. As shown, two grooves 4, one adjacent each bead seat 2, are provided each having a hole 5 in the axially outer groove face. A groove filler 8 is fitted to each groove 4 to provide the necessary bead seating for use of the assembly. The groove fillers 8 are made of rubber and seal the holes 5 so that the assembly can be inflated. Once again, incorrect assembly either by misplacement of a groove filler 8 or part of a groove filler or neglect to fit a filler will prevent air retention.

The air passage may be of any convenient size and more than one air passage can be provided in each groove. The circumferential position is not critical.

Figure 3:
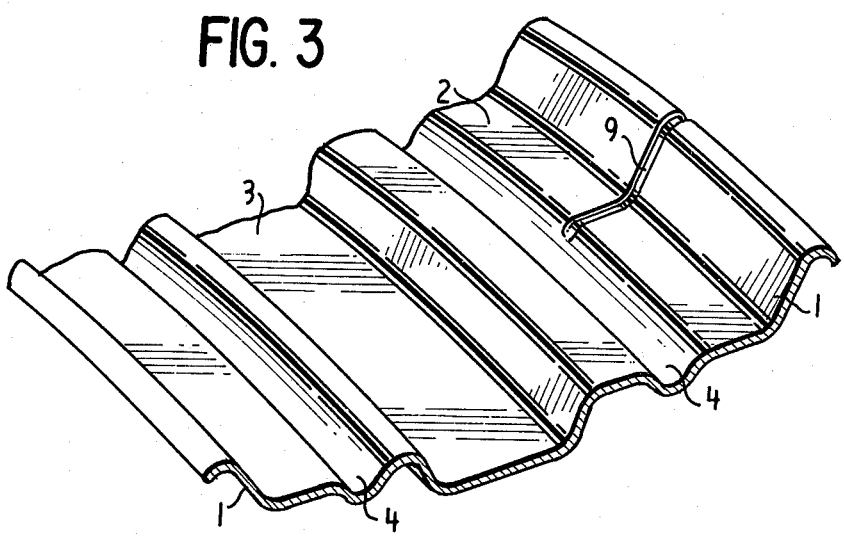
FIGS. 3 and 4 are perspective views showing a further embodiment of this invention.
Figure 4:
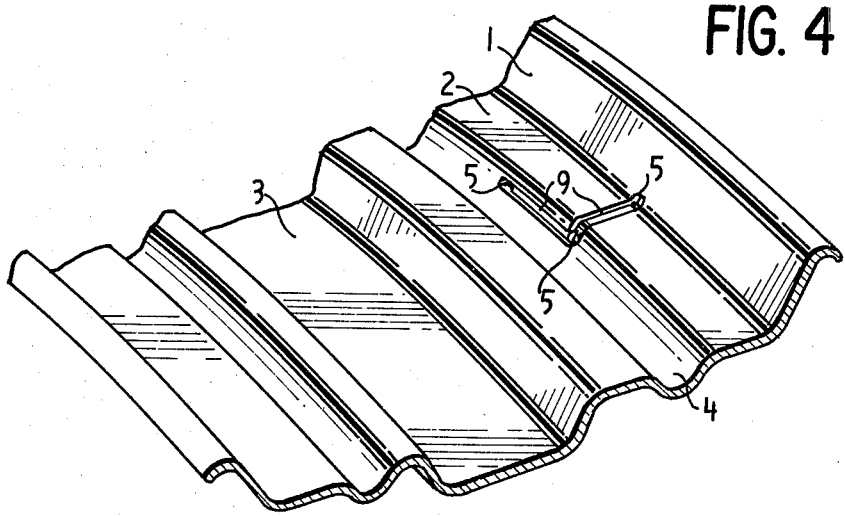

The air passage may begin at a point positioned at the base of the groove or in the axially inner face dependent on the toe shape of the initial tire wheel rim assembly although the axially outer face has been found the most satisfactory. As previously stated, and as depicted in FIGS. 3 and 4, the air passage may be in the form of a groove 9 formed in the radially outer surface of the wheel rim. The groove 9 may extend axially across the bead seat and up the flange as shown in FIG. 3 or it may be stopped short of the edge of the flange 1 and connected to an aperture 5 as shown in FIG. 4. Alternatively, also as shown in FIG. 4, there may be two or more air passages 5 interconnected by a circumferentially extending groove 9 along the face of groove 4.

Having now described my invention—what I claim is:

1. A one piece wheel rim comprising a pair of spaced-apart flanges, a tire bead seat adjacent each flange, a tire fitting well, and immediately adjacent at least one of the bead seats between the bead seat and the fitting well a circumferentially extending groove formed so as to be able to accommodate an extended bead retaining toe of a tire and means to prevent inflation of a tire which is incorrectly fitted or is not configured for said rim, said means comprising at least one discreet air pressure release passage extending from a point within the groove and positioned such that the point is covered by a correctly fitted extended bead retaining toe.

2. A wheel rim according to claim 1 wherein the point at which the passage begins in the surface of the groove is on the axially outer face of the groove.

3. A wheel rim according to claim 2 wherein the point at which the passage begins is in the center of the axially outer face of the groove.

4. A wheel rim according to claim 1 wherein the air passage comprises an aperture through the wheel rim.

5. A wheel rim according to claim 4 wherein the aperture comprises a circular hole through the wheel rim.

6. A wheel rim according to claim 1 wherein the air passage comprises a small groove formed in the axially outer surface of the wheel rim extending from said point in the bead toe groove across the bead seat and the axially inner surface of the flange so that air may escape to the atmosphere.

7. A wheel rim according to claim 1 wherein the air passage comprises a small groove formed in the axially outer surface of the wheel rim from the point in the bead toe groove at least to a second point axially outwards from the point and an aperture is provided at the second point through the wheel rim.

8. A wheel rim according to claim 6 wherein the small groove is formed by a deformation in the wheel rim material made by rolling or pressing.

9. A wheel rim according to claim 1 wherein at least two air passages are provided from at least two points in the same groove.

10. A wheel rim according to claim 9 wherein the at least two air passages are equally spaced in the circumferential direction of the groove.

11. A wheel rim according to claim 9 wherein the at least two air passages are interconnected by a small groove along the face of the groove.

12. A wheel rim according to claim 4 wherein the aperture is between 0.75 and 3 mm in diameter.

13. A wheel rim according to claim 4 wherein the aperture is between 1 mm and 1.5 mm in diameter.

14. A one piece wheel rim comprising:
a pair of spaced-apart flanges;
a tire bead seat adjacent each flange;
a tire fitting well between the bead seats;
immediately adjacent at least one of the bead seats, between the bead seat and the fitting well, a circumferentially extending groove formed so as to be able to accommodate an extended bead retaining toe of a tire;
means to prevent inflation of a tire which is incorrectly fitted or is not configured for said bead seat and groove, said means comprising at least one discreet air pressure release aperture extending from a point within the groove to the atmosphere;
said aperture being on the axially outer face of the groove and being positioned so that it is covered by a correctly fitted extended bead retaining toe.

* * * * *